Patented Aug. 8, 1944

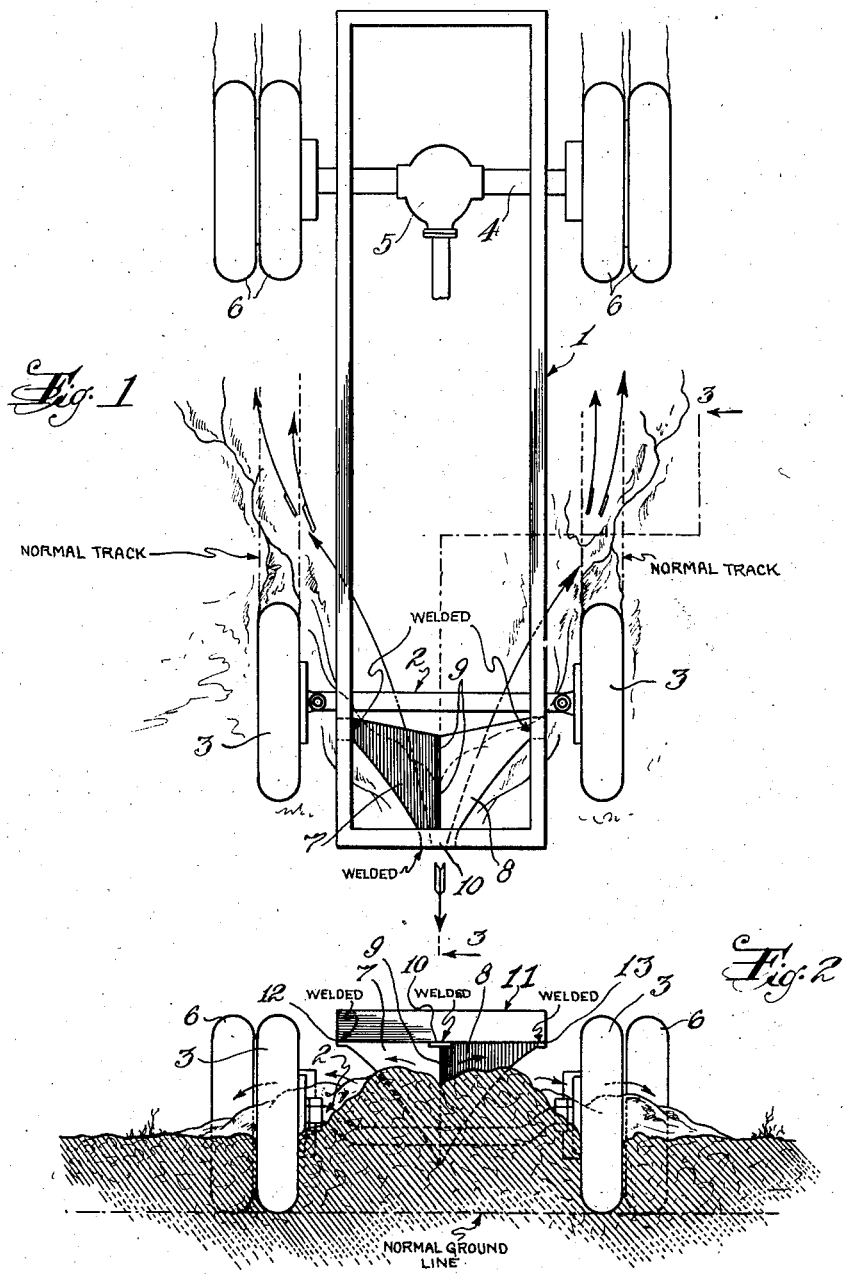

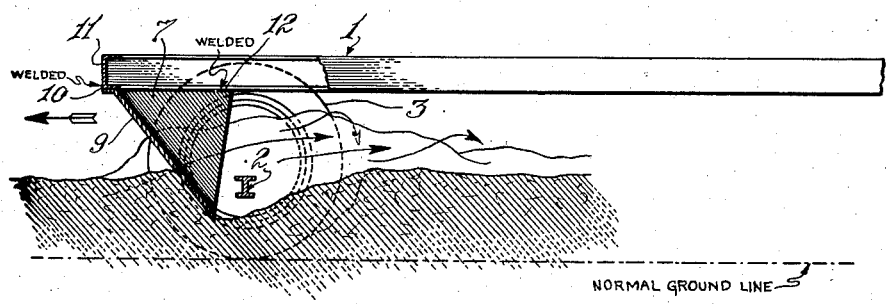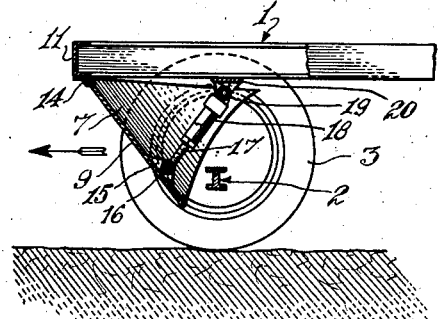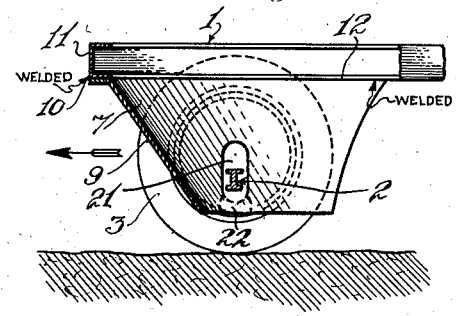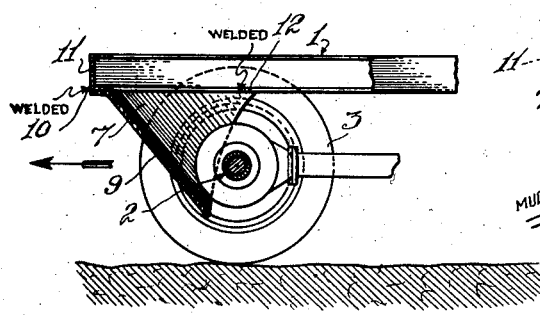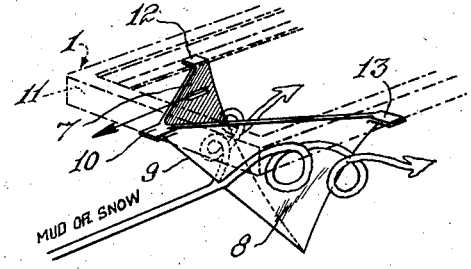

2,355,204

UNITED STATES PATENT OFFICE 2,355,204

AUTOMOTIVE VEHICLE RUT FILLER AND ANTISKID STRUCTURE

Kibbey W. Couse, Newark, N. J.

Application November 24, 1943, Serial No. 511,546

5 Claims. (Cl. 37—172)

This invention relates to a special type of rut filler and anti-skid structure particularly adapted for use in connection with automotive vehicles such as trucks and more particularly army trucks and traveling machine shops which may or may not be used by the army.

In the use of such vehicles, they are many times operated over muddy roads or soft ground, in sand or snow, and the front wheels sink in and make a rut of considerable depth so that when the rear wheels come along they sink still further into the mud, sand or snow, with danger of being completely stalled especially when the axles, transmission and differential of the vehicle reach a certain position. Also, when the front wheels are operating in mud or snow, the steering is seriously affected so that skidding is likely to occur.

To assist in obviating these difficulties, I have evolved a structure to be attached to the front end of the chassis of a vehicle, which has for its primary object the provision to throw at least some of the material forced under the chassis by the front wheels to a position in back of these wheels to refill the rut made by them, and since the structure is in the nature of a plow the danger of skidding is materially reduced.

My improved structure is illustrated in the annexed drawings, wherein:

Figure 1 is a skeleton plan view of the structure applied to an automotive chassis.

Figure 2 is a front view of Figure 1.

Figure 3 is a view on the line 3—3 of Figure 1.

Figure 4 is a view similar to Figure 3 but showing a modified form of construction wherein the structure is adjustable.

Figure 5 shows a still further modified form of structure.

Figure 6 is a further modified form showing the adaptability of the structure to a vehicle having a front wheel drive.

Figure 7 is a schematic illustration showing the flow of mud, sand or snow as the vehicle moves forward.

In the various views, wherein like numbers refer to corresponding parts, 1 is a chassis frame having a front axle 2 and wheels 3, and a rear axle 4, differential 5 and wheels 6. The rut filler and anti-skid structure is made up of two members 7 and 8 preferably of stiff metal which may be an alloy of steel to prevent rusting. The plates 7 and 8 are arranged in V shape, the apex line being indicated by 9. The plates are fastened together at the apex in any satisfactory manner as by welding, and at the top part of the apex line they are welded through the medium of the member 10 to the front cross-chassis member 11. The upper and outer parts of the plates are anchored as by welding at 12 and 13 to their respective side members of the chassis.

The plates are preferably curved as indicated in Figures 1 and 2 to simulate the furrow board of a plow, so that as the truck moves forward, the mud, sand, snow or what-not is thrown outwardly, somewhat as indicated in Figures 1 and 7, in back of the front wheels to fill up the rut made by these wheels.

As will be seen from Figures 2 and 3, the plates 7 and 8 are positioned forwardly of and extend below the front axle 2 so that the plow structure acts to clear a path for the axle, and since it is embedded more or less in the material through which the truck is traveling, the front wheels do not have so much tendency to skid.

In Figure 4 the top of the apex of the plow is pivoted to the front member of the chassis at 14 and each of the plates at the rear portion have fastened thereto, as by welding, a fitting 15 on which is pivoted, at 16, a strong screw 17 for adjustably engaging a member 18 that is pivoted at 19 to a fitting 20 welded to its side chassis member. In this form, the top portions of the plates 7 and 8 extend over and to the rear of the front axle 2.

In Figure 5 the plates extend below and a considerable distance back of the front axle, the plates having orifices 21 therein sufficiently large to clear the axle, reach and tie rods used in steering the vehicle. To make it easy to install the plate, the orifice 21 is cut out to the bottom edge of the plate. Then, after the plate is passed over the axle 2, by way of the open orifice, it is welded to the frame, and then a piece 22 is preferably welded in place to close the bottom of the orifice 21.

In Figure 6 the plates are of approximately the same form as shown in Figure 4, only they are anchored to the chassis in a manner similar to that illustrated in Figure 3.

By filling up the rut made by the front wheels by removing more or less of the material embraced by the front wheels, a material increase in the efficiency of operation of the vehicle is obtained.

What I claim is:

1. For an automotive vehicle including a chassis having a pair of side members and a front cross member and supported adjacent its front end by a pair of front wheels carried by a front axle, a rut filler and anti-skid structure comprising a pair of stiff metal plates reversely curved to simulate the furrow board of a plow, the plates being arranged in V shape and anchored as by welding together along the vertex of the V and also fastened at the vertex to the front cross-member of the vehicle chassis, while the upper and outer parts of the plates are anchored to the opposite side members of the vehicle chassis between the front wheels of the vehicle, the plates extending downwardly below the vehicle axle.

2. For an automotive vehicle including a chassis having a pair of side members and a front cross member and supported adjacent its front end by a pair of front wheels carried by a front axle, a rut filler and anti-skid structure comprising a pair of stiff metal plates reversely curved to simulate the furrow board of a plow, the plates being arranged in V shape and anchored as by welding together along the vertex of the V, the upper part of the vertex portion being pivotally anchored to the front cross-member of the vehicle chassis, while the rear parts of the V are adjustably fastened to their respective side chassis members, the plates extending below the vehicle axle and fully between the front wheels of the vehicle.

3. For an automotive vehicle including a chassis having a pair of side members and a front cross member and supported adjacent its front end by a pair of front wheels carried by a front axle, a rut filler and anti-skid structure comprising a pair of stiff metal plates reversely curved to simulate the furrow board of a plow, the plates being arranged in V shape and anchored as by welding together along the vertex of the V, and also fastened at the vertex to the front cross-member of the vehicle chassis, the plates extending below and back of the axle but between the front wheels and having openings therein to clear the axle and also having upper extending portions fastened as by welding to their respective side chassis members.

4. For an automotive vehicle including a chassis having a pair of side members and a front cross member and supported adjacent its front end by a pair of front wheels carried by a front axle, a rut filler and anti-skid structure comprising a pair of strong plates arranged in V shape and anchored together along the apex portion of the V, which portion is fastened at the top to a front chassis member, the plates extending below the plane of the vehicle front axle and having their rearward upper portions fastened to their respective chassis side members within the wheel gauge of the vehicle.

5. For an automotive vehicle including a chassis having a pair of side members and a front cross member and supported adjacent its front end by a pair of front wheels carried by a front axle, a rut filler and anti-skid structure comprising a pair of strong plates arranged in V shape and anchored together along the apex portion of the V, which portion is fastened at the top to a front chassis member, the plates having parts extending below the front axle of the vehicle and other parts extending rearwardly beyond the front axle, these latter extending parts being fastened to their respective side members of the chassis within the wheel gauge of the vehicle.

KIBBEY W. COUSE.